US012011927B2

(12) United States Patent
Yamaguchi

(10) Patent No.: US 12,011,927 B2
(45) Date of Patent: Jun. 18, 2024

(54) INKJET RECORDING APPARATUS

(71) Applicant: KYOCERA Document Solutions Inc., Osaka (JP)

(72) Inventor: Kiyotaka Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 120 days.

(21) Appl. No.: 17/984,031

(22) Filed: Nov. 9, 2022

(65) Prior Publication Data

US 2023/0150263 A1 May 18, 2023

(30) Foreign Application Priority Data

Nov. 12, 2021 (JP) ................................ 2021-184879

(51) Int. Cl.
*B41J 2/155* (2006.01)
*B41J 2/07* (2006.01)
*B41J 2/125* (2006.01)
*B41J 11/00* (2006.01)
*B41J 29/377* (2006.01)

(52) U.S. Cl.
CPC ............... *B41J 2/155* (2013.01); *B41J 2/072* (2013.01); *B41J 2/125* (2013.01); *B41J 11/007* (2013.01); *B41J 2202/08* (2013.01)

(58) Field of Classification Search
CPC ...... B41J 2/3358; B41J 2/1408; B41J 29/377; B41J 2202/08
See application file for complete search history.

(56) References Cited

U.S. PATENT DOCUMENTS 6,484,975 B1 * 11/2002 Elrod .................. B41J 2/14008 347/18

FOREIGN PATENT DOCUMENTS

JP H 08-276575 A 10/1996

* cited by examiner

*Primary Examiner* — Julian D Huffman
(74) *Attorney, Agent, or Firm* — Stein IP, LLC

(57) ABSTRACT

An inkjet recording apparatus includes a conveying portion, a recording portion including a line head including a plurality of recording heads, a temperature detecting portion, a cooling mechanism, and a control portion. The cooling mechanism includes a storing portion that stores cooling liquid, a circulation path of the cooling liquid that is arranged to be branched into a plurality of branch paths passing near the recording heads, a heat dissipating portion that dissipates heat of the cooling liquid, and a pump that causes the cooling liquid to circulate. If there exists, among the recording heads, a recording head that is predicted to undergo a temperature rise, the control portion increases a flow amount or circulation time of the cooling liquid in whichever of the branch paths serves as a flow path of the cooling liquid flowing toward the recording head that is predicted to undergo a temperature rise.

8 Claims, 6 Drawing Sheets

INKJET RECORDING APPARATUS

INCORPORATION BY REFERENCE

This application is based on and claims the benefit of priority from Japanese Patent This application is based on and claims the benefit of priority from Japanese Patent Application No. 2021-184879 filed on Nov. 12, 2021, the contents of which are hereby incorporated by reference.

BACKGROUND

The present disclosure relates to an inkjet recording apparatus, and particularly relates to a cooling mechanism for cooling a recording head that ejects ink.

Inkjet recording apparatuses that record an image by ejecting ink from nozzles provided in recording heads are capable of forming a high-definition image and thus have been widely used as recording apparatuses such as facsimile machines, copiers, and printers.

In such an inkjet recording apparatus, the temperature of the recording head varies depending on factors such as the operation history and the installation environment of the apparatus, and this may cause uneven image density. A drastic rise in temperature of the recording head may cause an ink discharge error and a discharge failure. Further, in an inkjet recording apparatus capable of recording color images, temperature unevenness among inkjet heads for different colors may cause variations in color tone of images.

A cause of such inconvenience is that IC chips (CPU) mounted in recording heads are liable to malfunction under a temperature equal to or higher than a predetermined temperature. Thus, in order to maintain ink ejection capacity, it is necessary to keep the temperature of a recording head, especially the temperature of an IC chip, within a constant range.

SUMMARY

According to an aspect of the present disclosure, an inkjet recording apparatus includes a conveying portion, a recording portion, a temperature detecting portion, a cooling mechanism, and a control portion. The conveying portion conveys a recording medium. The recording portion includes a line head for each color, the line head including a plurality of recording heads that are arranged along a width direction of the recording medium orthogonal to a conveyance direction of the recording medium, and that execute a printing process by ejecting ink onto the recording medium conveyed by the conveying portion. The temperature detecting portion detects a temperature of the recording heads. The cooling mechanism cools the recording heads based on a result of detection by the temperature detecting portion. The control portion controls the cooling mechanism. The cooling mechanism includes a storing portion, a circulation path, a heat dissipating portion, and a pump, and the cooling mechanism is provided one for each of the line heads. The storing portion stores a cooling liquid. The circulation path has opposite ends thereof connected to the storing portion, is arranged to be branched into a plurality of branch paths so as to pass near the recording heads, and receives heat of the recording heads by means of the cooling liquid circulating therein. The heat dissipating portion is arranged in the circulation path, at a position downstream from the recording heads with respect to a circulation direction of the cooling liquid, and dissipates heat of the cooling liquid. The pump is arranged in the circulation path, at a position upstream from the recording heads with respect to the circulation direction of the cooling liquid, and causes the cooling liquid to circulate in the circulation path. If there exists, among the recording heads, a recording head that is predicted to undergo a temperature rise as compared with others of the recording heads, when driving the cooling mechanism, the control portion increases a flow amount or circulation time of the cooling liquid in whichever of the branch paths serves as a flow path of the cooling liquid flowing toward the recording head that is predicted to undergo a temperature rise, as compared with in others of the branch paths.

DETAILED DESCRIPTION

Figure 1:
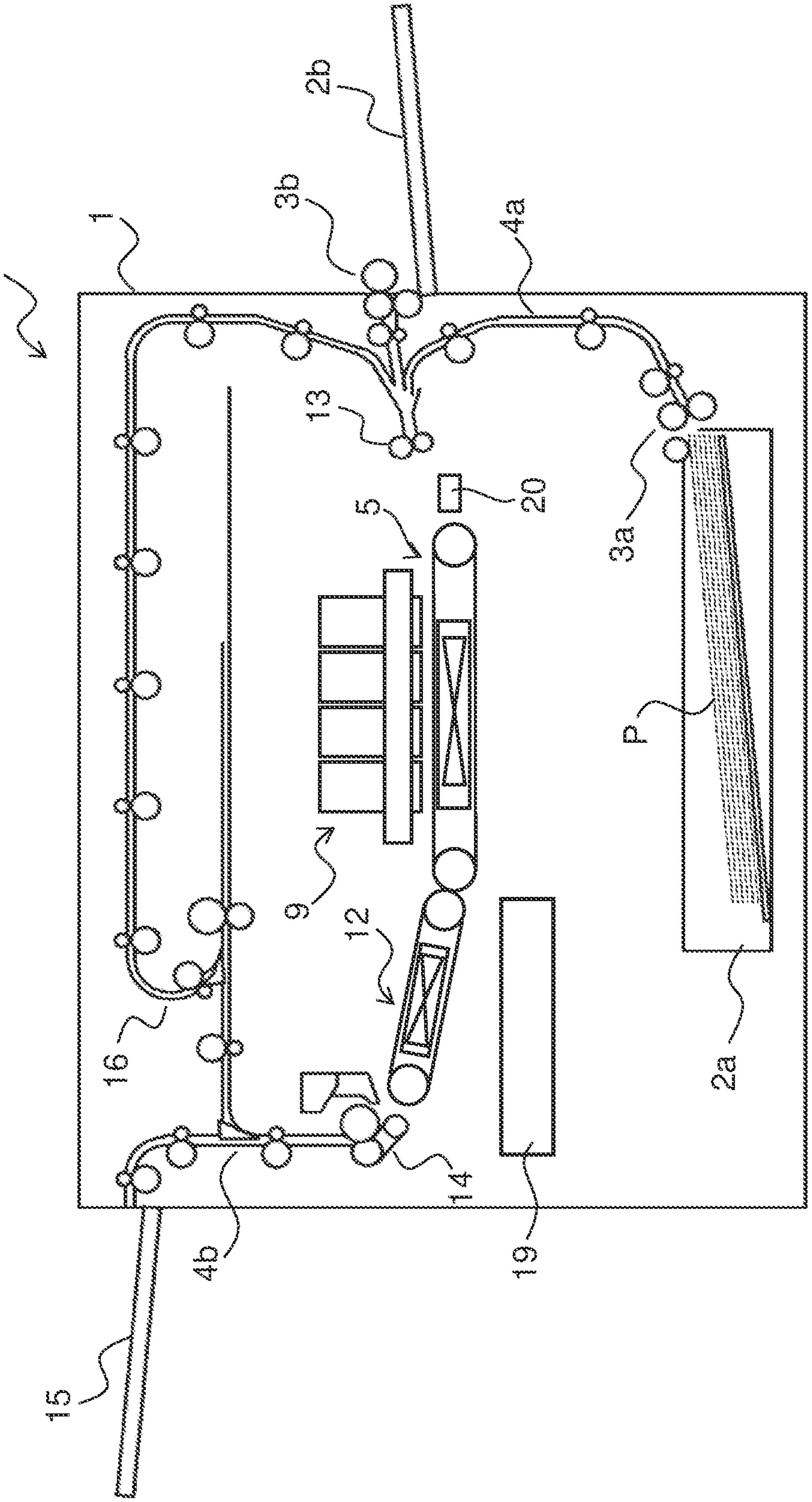
FIG. 1 is a side sectional view schematically showing a configuration of a printer according to an embodiment of the present disclosure.
Figure 2:
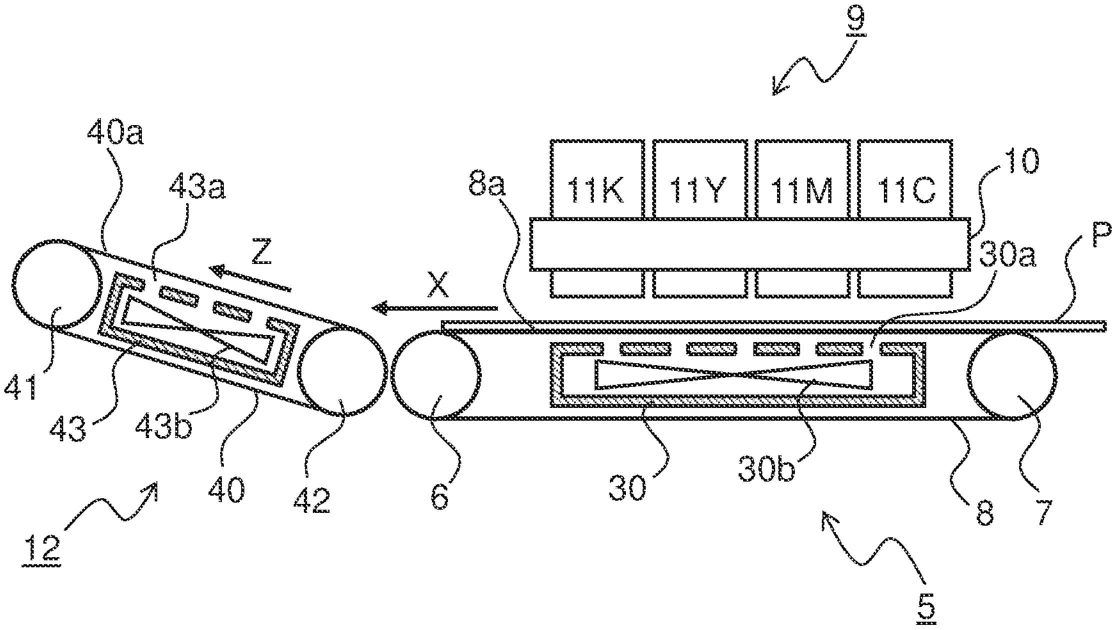
FIG. 2 is a side sectional view showing a structure around a first belt conveying portion, a recording portion, and a second belt conveying portion of the printer.
Figure 3:
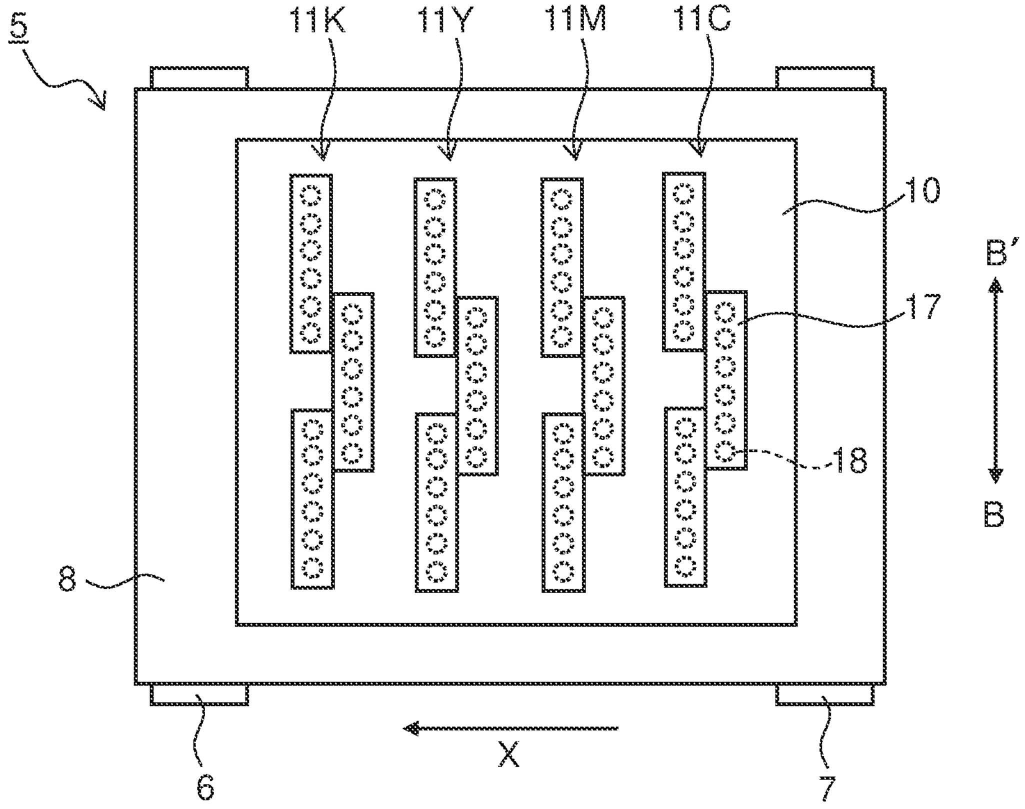
FIG. 3 is a plan view of the first belt conveying portion and the recording portion of the printer as viewed from above.

Hereinafter, an embodiment of the present disclosure will be described with reference to the accompanying drawings. FIG. 1 is a diagram schematically showing a configuration of a printer 100 employing an inkjet printing method according to an embodiment of the present disclosure. FIG. 2 is a side sectional view showing a structure around a first belt conveying portion 5, a recording portion 9, and a second belt conveying portion 12 of the printer 100. FIG. 3 is a plan view of the first belt conveying portion 5 and the recording portion 9 of the printer 100 as viewed from above.

As shown in a FIG. 1, in the printer 100, in a lower portion inside a printer main body 1, a sheet feeding cassette 2_a_ is arranged as a sheet containing portion, and a manual sheet feeding tray 2_b_ is provided on an outer right side surface of the printer main body 1. Downstream of the sheet feeding cassette 2_a_ in a sheet conveying direction (that is, to the upper right of the sheet feeding cassette 2_a_ in FIG. 1), a sheet feeding device 3_a_ is arranged. Downstream of the manual sheet feeding tray 2_b_ in the sheet conveying direction (that is, to the left of the manual sheet feeding tray 2_b_ in FIG. 1), a sheet feeding device 3_b_ is arranged. By these sheet feeding devices 3_a_ and 3_b_, sheets P are separated from each other to be conveyed one by one.

Inside the printer 100, a first sheet conveying path 4_a_ is provided. The first sheet conveying path 4_a_ is located to the upper right of the sheet feeding cassette 2_a_, and to the left of the manual sheet feeding tray 2_b_. A sheet P sent out from the sheet feeding cassette 2_a_ passes through the first sheet conveying path 4_a_ to be conveyed vertically upward along a side surface of the printer main body 1. A sheet P sent out from the manual sheet feeding tray 2*b* passes through the first sheet conveying path 4*a* to be conveyed substantially horizontally leftward.

At a downstream end of the first sheet conveying path 4*a* with respect to the sheet conveying direction, a pair of registration rollers are provided. Further, closely downstream of the pair of registration rollers 13, the first belt conveying portion (conveying portion) 5 and the recording portion 9 are arranged. The pair of registration rollers 13 on one hand correct skewed feeding of a sheet P, and on the other hand send out a sheet P toward the first belt conveying portion 5 with timing coordinated with an ink ejection operation executed by the recording portion 9.

Further, between the pair of registration rollers 13 and the first belt conveying portion 5, there is arranged a contact image sensor (CIS) 20 for detecting a position of an edge of a sheet P in a width direction of the sheet P (a direction perpendicular to the sheet conveying direction).

The first belt conveying portion 5 is provided with a first conveying belt 8 which is an endless belt wound around a first driving roller 6 and a first driven roller 7. A sheet P sent out from the pair of registration rollers 13 passes under the recording portion 9 while being sucked and held on a conveying surface 8*a* (an upper surface in FIG. 1) of the first conveying belt 8.

At a position that is inside the first conveying belt 8 and opposite a back side of the conveying surface 8*a* of the first conveying belt 8, a first sheet sucking portion 30 is provided. The first sheet sucking portion 30, having a large number of holes 30*a* for air suction formed in an upper face thereof and a fan 30*b* arranged inside thereof, is capable of sucking air downward through the upper face thereof. The first conveying belt 8 is also provided with a large number of vent holes (not shown) for air suction. This configuration allows the first belt conveying portion 5 to convey a sheet P while sucking and holding the sheet P on the conveying surface 8*a* of the first conveying belt 8.

The recording portion 9 performs recording of an image on a sheet P conveyed thereto by being sucked and held on the conveying surface 8*a* of the first conveying belt 8. As shown in FIGS. 2 and 3, the recording portion 9 includes a head housing 10 and four line heads 11C, 11M, 11Y, and 11K supported in the head housing 10. These line heads 11C to 11K each have a recording area as wide as or wider than a sheet P conveyed, are each supported at such a height that a predetermined gap (for example, 1 mm) is formed with respect to the conveying surface 8*a* of the first conveying belt 8, and each have three recording heads 17 arranged in a staggered array along a sheet width direction (a BB' direction in FIG. 3) orthogonal to the sheet conveying direction. The recording heads 17 each have an ink ejection surface, in which a large number of ink ejection nozzles 18 are arrayed.

The recording heads 17 constituting the line heads 11C to 11K are fed with ink of four colors (cyan, magenta, yellow, and black) stored in ink tanks (not shown) corresponding to the colors of the line heads 11C to 11K.

According to information included in image data received from an external computer or the like, the line heads 11C to 11K sequentially eject ink of cyan, magenta, yellow, and black from the ink ejection nozzles 18 of the recording heads 17 corresponding to printing positions toward a sheet P conveyed by being sucked and held on the conveying surface 8*a* of the first conveying belt 8. As a result, on the sheet P, there is formed a full-color image having ink of the four colors, namely, cyan, magenta, yellow, and black, superposed one on top of another.

Downstream of the first belt conveying portion 5 with respect to the sheet conveying direction (a left side in FIG. 1), the second belt conveying portion 12 is arranged. A sheet P having had an image recorded thereon at the recording portion 9 is sent to the second belt conveying portion 12, and the ink which has been ejected onto a surface of the sheet P is dried while the sheet P passes through the second belt conveying portion 12.

The second belt conveying portion 12 includes a second conveying belt 40 which is an endless belt wound around a second driving roller 41 and a second driven roller 42. The second conveying belt 40 is caused by the second driving roller 41 to rotate counterclockwise in FIG. 2. The sheet P having had an image recorded thereon by the recording portion 9 and having been conveyed by the first belt conveying portion 5 in an arrow-X direction is transferred to the second belt conveying belt 40 to be conveyed in an arrow-Z direction in FIG. 2.

At a position that is inside the second conveying belt 40 and is opposite a back side of the conveying surface 40*a* of the second conveying belt 40, a second sheet sucking portion 43 is provided. The second sheet sucking portion 43, having a large number of holes 43*a* for air suction formed in an upper face thereof and a fan 43*b* arranged inside thereof, is capable of sucking air downward through the upper face thereof. The second conveying belt 40 also has a large number of vent holes (not shown) for air suction formed therein. This configuration allows the second belt conveying portion 12 to convey a sheet P while sucking and holding the sheet P on the conveying surface 40*a* of the second conveying belt 40.

At a position that is downstream of the second belt conveying portion 12 with respect to the sheet conveying direction and is close to a left side surface of the printer main body 1, a decurler portion 14 is provided. A sheet P having had the ink thereon dried at the second belt conveying portion 12 is sent to the decurler portion 14, where a curl developed in the sheet P is corrected.

Downstream of (in FIG. 1, above) the decurler portion 14 with respect to the sheet conveying direction, a second sheet conveying path 4*b* is provided. In a case where duplex recording is not to be performed, after passing through the decurler portion 14, the sheet P is conveyed through the second sheet conveying path 4*b*, via a pair of discharge rollers, onto a sheet discharge tray 15 provided on an outer left side surface of the printer 100. In a case where duplex recording is to be performed, the sheet P on one side of which recording has been completed passes through the second belt conveying portion 12 and the decurler portion 14, and then passes through the second sheet conveying path 4*b* to be conveyed into a reverse conveying path 16. In the reverse conveying path 16, the sheet conveying direction is switched to turn the sheet P upside down, and then the sheet P passes through an upper portion of the printer 100 to be conveyed to the pair of registration rollers 13. Then, the sheet P is conveyed, with its unrecorded surface up, back to the first belt conveying portion 5.

Under the second belt conveying portion 12, a maintenance unit 19 is arranged. When executing maintenance of the recording heads 17, the maintenance unit 19 moves to under the recording portion 9 to wipe off the ink ejected (purged) from the ink ejection nozzles 18 of the recording heads 17, and collects the wiped-off ink.

Figure 4:
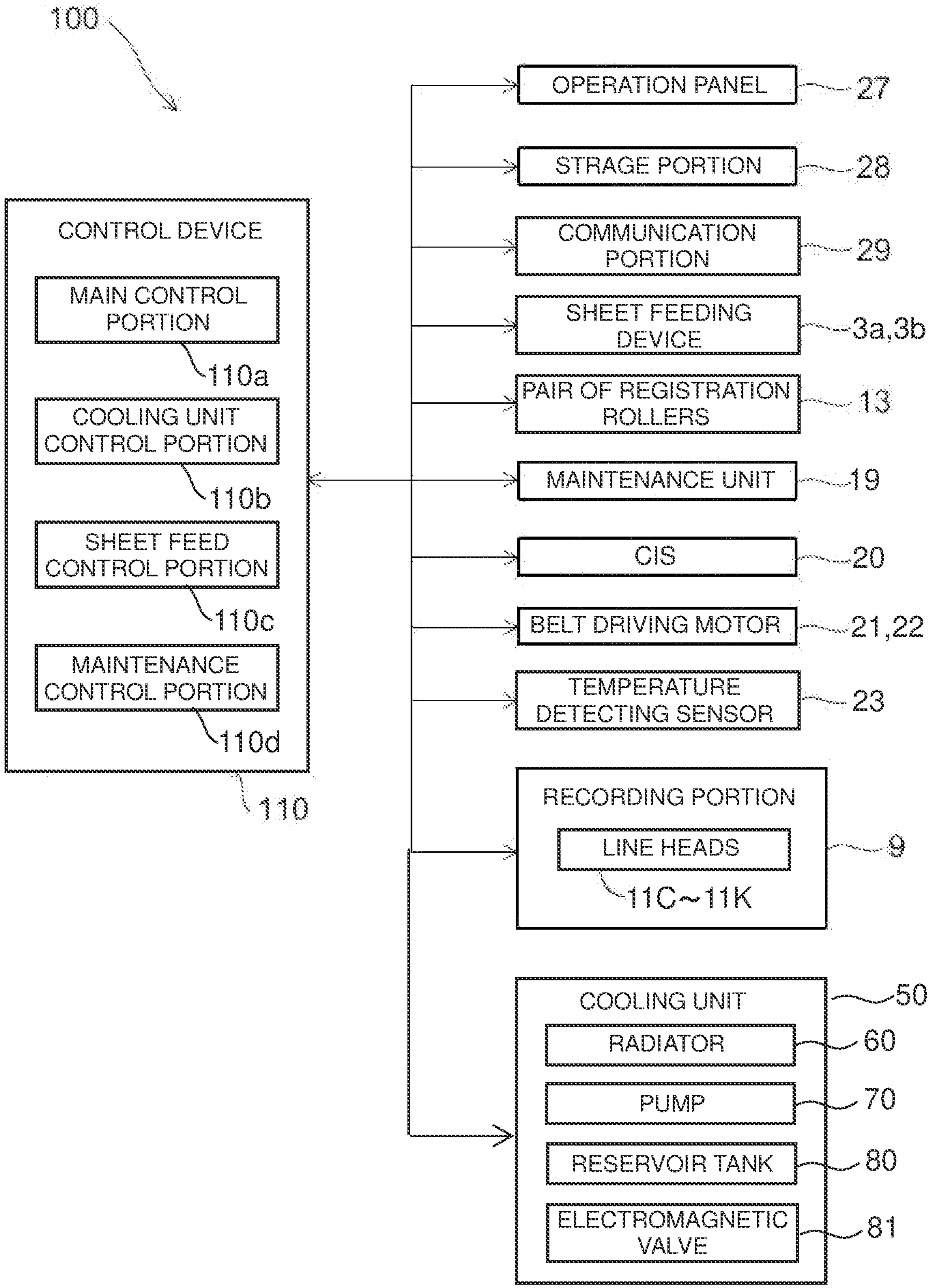
FIG. 4 is a block diagram showing an example of a control path of the printer.

FIG. 4 is a block diagram showing an example of a control path of the printer 100. In addition to the above-mentioned configuration, the printer 100 further includes belt driving motors 21 and 22, a temperature detecting sensor 23, an operation panel 27, a storage portion 28, a communication portion 29, and a cooling unit 50.

The belt driving motors 21 and 22 respectively cause the first driving roller 6 and the second driving roller 41 to rotate to thereby cause the first conveying belt 8 and the second conveying belt 40 to rotate.

The temperature detecting sensor 23 is provided in the recording portion 9 inside the printer 100, and detects an ambient temperature of the recording heads 17. Note that the temperature detecting sensor 23 may instead detect a surface temperature or an inner temperature of the recording heads 17. A result of detection by the temperature detecting sensor 23 is transmitted to a cooling unit control portion 110*b*.

An operation panel 27 is an operation portion for accepting inputs of various settings. For example, by operating the operation panel 27, a user can input a size of a sheet P to be set in the sheet feeding cassette 2*a* or in the manual sheet feeding tray 2*b*, that is, the size of the sheet P to be conveyed by the first conveying belt 8. By operating the operation panel 27, the user can also input the number of sheets P to be printed and give an instruction to start a print job. The operation panel 27 further functions as a notification device that provides notification regarding the operation status of the printer 100.

The storage portion 28 is a memory that stores an operation program for a control device 110 and various kinds of information, and is configured by including a read only memory (ROM), a random-access memory (RAM), a non-volatile memory, etc. Information set via the operation panel 27 is stored in the storage portion 28.

The communication portion 29 is a communication interface for transmitting and receiving information to and from an external device (for example, a personal computer (PC)). For example, when the user operates a PC to transmit a printing command together with image data to the printer 100, the image data and the printing command is input to the printer 100 via the communication portion 29. In the printer 100, a main control portion 110*a* controls the recording heads 17 based on the image data mentioned above and causes them to eject ink, whereby an image can be recorded on a sheet P.

The cooling unit 50 cools the recording heads 17 arranged in each of the line heads 11C to 11K of the recording portion 9. The configuration of the cooling unit 50 will be described later in detail.

The printer 100 of the present embodiment includes the control device 110. The control device 110 is configured by including, for example, a central processing unit (CPU) and a memory. Specifically, the control device 110 includes the main control portion 110*a*, the cooling unit control portion 110*b*, a sheet feed control portion 110*c*, and a maintenance control portion 110*d*.

The main control portion 110*a* controls operations of various portions of the printer 100. For example, operations such as driving of various rollers provided inside the printer 100, ejection of ink from the recording heads 17 during image recording, and the like are controlled by the main control portion 110*a*.

The cooling unit control portion 110*b*, based on the ambient temperature of the recording heads 17 detected by the temperature detecting sensor 23, determines whether or not the recording heads 17 need to be cooled by the cooling unit 50; and if the recording heads 17 need to be cooled, the cooling unit control portion 110*b* transmits a control signal to the cooling unit 50 to drive the cooling unit 50.

The sheet feed control portion 110*c* is a recording medium feeding control portion that controls the pair of registration rollers 13 functioning as a recording medium feeding portion. For example, the sheet feed control portion 110*c* controls the pair of registration rollers 13 based on timing when the CIS 20 detects the rear edge of a sheet P, to thereby control the timing of conveying the subsequent sheet P.

The maintenance control portion 110*d* performs control for causing the recording heads 17 to execute the above-described purging of forcibly pushing the ink out of each of the ink ejection nozzles 18. When causing the recording heads 17 to execute the purging, the maintenance control portion 110*d* also controls driving of the above-described maintenance unit 19 (for example, movement and retreat of the maintenance unit 19 downward of the recording portion 9).

The control device 110 may further include a calculation portion that performs necessary calculations and a timer that counts time. Or, the functions of the calculation portion and the timer may also be executed by the main control portion 110*a*.

Figure 5:
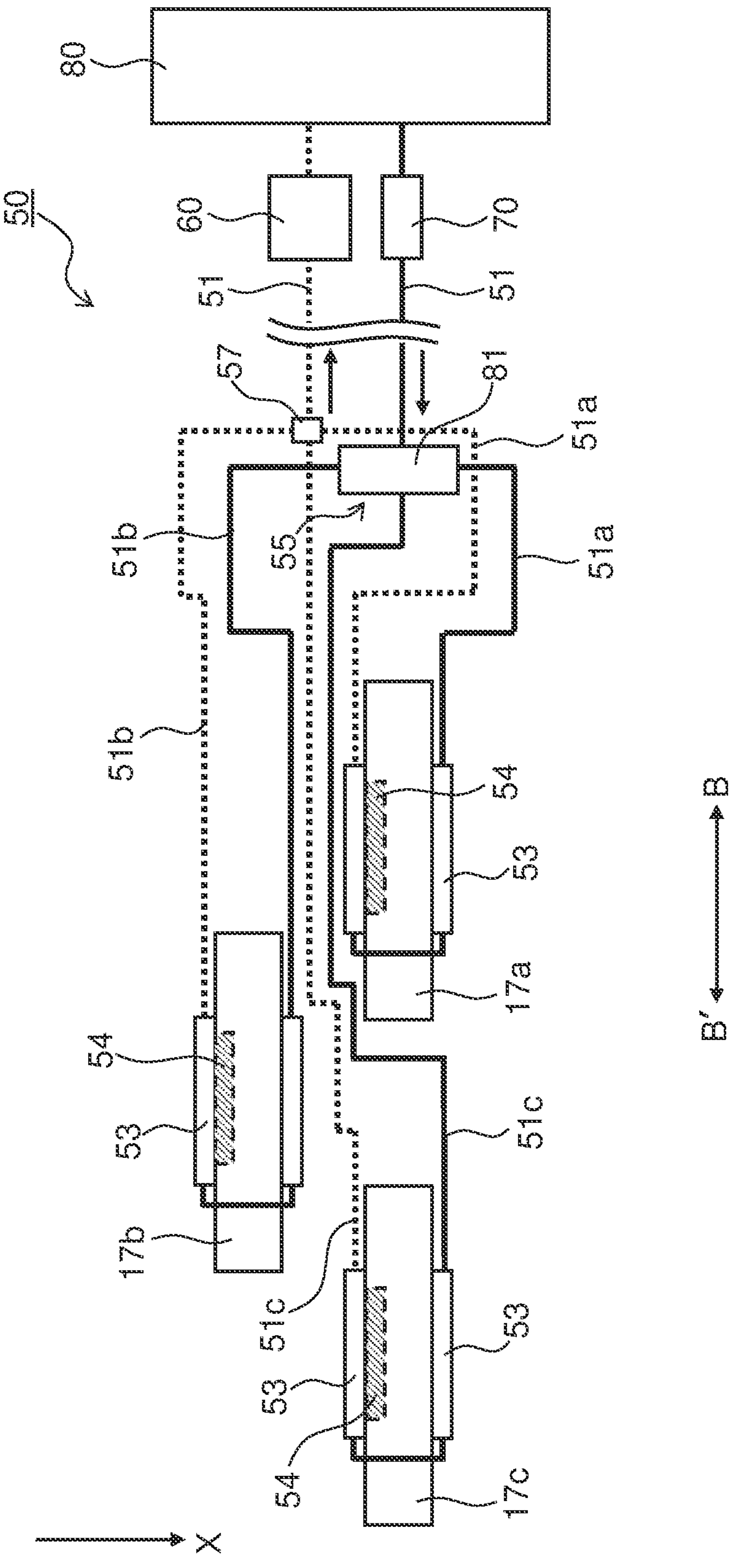
FIG. 5 is a schematic diagram of a cooling unit used in the printer of the present embodiment.

FIG. 5 is a schematic diagram of the cooling unit 50 used in the printer 100 of the present embodiment. FIG. 5 shows the cooling unit 50 that cools the recording heads 17 arranged in the line head 11C; the other line heads 11Y to 11K are also each provided with the cooling unit 50 for cooling the recording heads 17 arranged therein, and all the cooling units 50 have completely the same configuration. For convenience of description, a distinction is made among the three recording heads 17 arranged in the line head 11C, such that the one arranged on the left side (an arrow-B direction side) looking in the sheet conveying direction (the arrow-X direction) will be referred to as the recording head 17*a*, the one arranged at the center will be referred to as the recording head 17*b*, and the one arranged on the right side (an arrow-B' direction side) will be referred to as the recording head 17*c*.

The cooling unit 50 includes a circulation tube (a circulation path) 51, a radiator (a heat dissipating portion) 60, a pump 70, a reservoir tank (a storing portion) 80, and an electromagnetic valve 81. The circulation tube 51 has opposite end portions thereof connected to the reservoir tank 80, and is arranged so as to pass near the recording heads 17*a* to 17*c*, and a cooling liquid (here, water) stored in the reservoir tank 80 is caused to circulate in the circulation tube 51 to thereby receive heat of the recording heads 17*a* to 17*c*.

The circulation tube 51, at a branching portion 55 located downstream of the electromagnetic valve 81 with respect to a circulation direction of the cooling liquid, branches into three tubes, namely, a first tube 51*a*, a second tube 51*b*, and a third tube 51*c*, which are rejoined into one path at a joining portion 57. The first, second, and third tubes 51*a*, 51*b*, and 51*c* are arranged so as to pass near the recording heads 17*a*, 17*b*, and 17*c*, respectively. Of the circulation tube 51, flow paths (forward paths) from the reservoir tank 80 to the recording heads 17*a* to 17*c* are indicated by solid lines, and flow paths (return paths) from the recording heads 17*a* to 17*c* to the reservoir tank 80 are indicated by dotted lines.

The first, second, and third tubes 51*a*, 51*b*, and 51*c* are in contact with the recording heads 17*a*, 17*b*, and 17*c*, respectively, via heat receiving portions 53. The heat receiving portions 53 are formed of a thermally conductive material such as ceramic, for example, and have a high thermal conductivity. The heat receiving portions 53 are arranged adjacent to IC chips 54 mounted on the recording heads 17*a* to 17*c*. Note that, instead of providing the heat receiving portions 53, the first to third tubes 51*a* to 51*c* themselves may be formed as silicone or rubber tubes containing a thermally conductive material such as ceramic to be arranged in contact with the recording heads 17*a* to 17*c*.

The radiator 60 is arranged downstream from the joining portion 57 of the circulation tube 51 with respect to the circulation direction of the cooling liquid, and dissipates heat of the cooling liquid in the circulation tube 51. The radiator 60 is provided with a cooling fan (not shown) for air-cooling of the cooling liquid flowing through the radiator 60.

The pump 70 is arranged upstream from the branching portion 55 (the electromagnetic valve 81) of the circulation tube 51 with respect to the circulation direction of the cooling liquid, and circulates the cooling liquid in the circulation tube 51. The reservoir tank 80 temporarily stores the cooling liquid.

The electromagnetic valve 81 is arranged in the branching portion 55, at which the circulation tube 51 is branched into the first to third tubes 51*a* to 51*c*. The electromagnetic valve 81 is capable of individually opening and closing flow paths toward the first to third tubes 51*a* to 51*c*.

The cooling liquid sent out from the reservoir tank 80 by the pump 70 flows toward at least one of the first to third tubes 51*a* to 51*c* via the electromagnetic valve 81 receives heat of the recording heads 17*a* to 17*c* while passing through the heat receiving portions 53, and is then cooled at the radiator 60. After being cooled at the radiator 60, the cooling liquid returns into the reservoir tank 80.

If, at start of printing, the temperature of the recording heads 17*a* to 17*c* is above an upper limit value (for example, 75° C.) of a printable temperature, it is necessary to drive the cooling unit 50 to cool the recording heads 17*a* to 17*c* down to the upper limit value of the printable temperature or below.

However, if, in the next printing process (print job), printing is performed with respect to a sheet P of which a width-direction size is a predetermined size (for example, A4 lateral size) or smaller, ink is not ejected from the recording heads 17*a* and 17*c* located on opposite sides in the width direction, but ink is ejected only from the recording head 17*b* located at the center in the width direction. Accordingly, even when the temperature of the recording heads 17*a* and 17*c* is above the upper limit value of the printable temperature, the printing process can be executed as long as the temperature of the recording head 17*b* is equal to or lower than the upper limit value of the printable temperature.

Thus, in the present embodiment, by providing the electromagnetic valve 81 at the branching portion 55 of the circulation tube 51 and by switching the flow path of the cooling liquid by means of the electromagnetic valve 81, cooling is performed focusing on whichever of the recording heads 17*a* to 17*c* is to be used in the next the printing process. Specifically, in starting printing when the temperature of the recording heads 17*a* to 17*c* is above a range of the printable temperature and the next printing is to be performed with respect to a sheet P of which the width-direction size is a predetermined size or less and for printing on which only the recording head 17*b* at the center in the width direction is to be used, the flow path of the cooling liquid is switched by means of the electromagnetic valve 81 to the second tube 51*b* alone to concentrate the flow of the cooling liquid to the recording head 17*b*.

Thereby, even with the configuration where the single pump 70 is used to cool the three recording heads 17*a* to 17*c* arranged in each of the line heads 11C to 11K, it is possible to individually cool the three recording heads 17*a* to 17*c*, and thus to effectively cool only a desired one or more of the recording heads 17*a* to 17*c*. Also, since only whichever of the recording heads 17*a* to 17*c* is to be used in the next printing process is cooled before printing is started, it is possible to cool only a minimum necessary number of the recording heads 17*a* to 17*c* in a short period of time. As a result, the printing waiting time is shortened, and further the printing efficiency (productivity) is improved.

Figure 6:
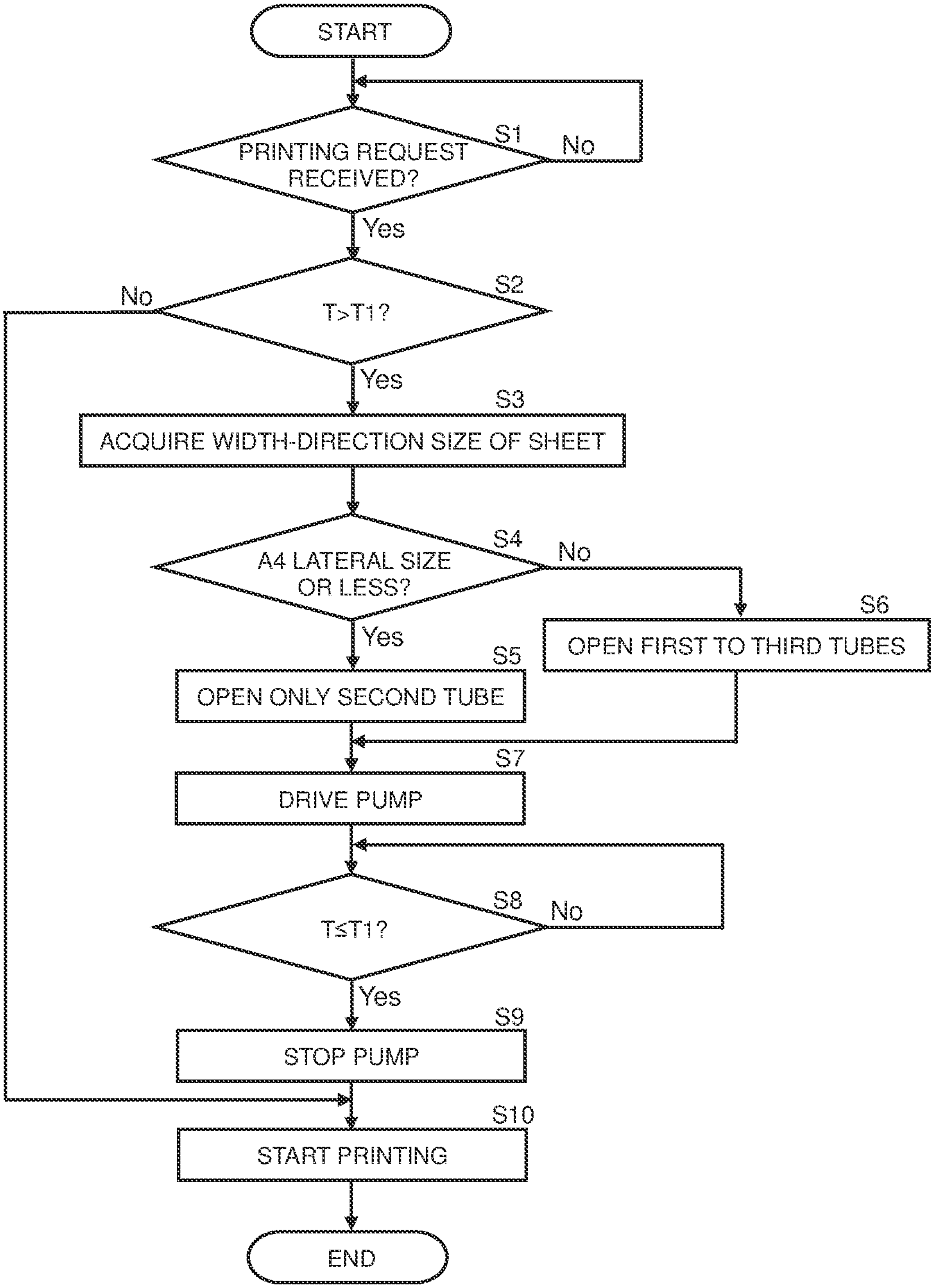
FIG. 6 is a flow chart showing an example of recording-head cooling control executed in the printer before printing is started.

FIG. 6 is a flow chart showing an example of cooling control executed in the printer 100 with respect to the recording heads 17*a* to 17*c* before printing is started. Referring to FIGS. 1 to 5 as necessary and following the steps shown in FIG. 6, a description will be given of a procedure of cooling the recording heads 17*a* to 17*c* executed before printing is started.

The main control portion 110*a* determines whether or not a printing request has been received via the communication portion 29 from a host device such as a personal computer (step S1). If no printing request has been received (No in step S1), a printing standby state is maintained. If a printing request has been received (Yes in step S1), the cooling unit control portion 110*b* determines whether or not a temperature T of the recording heads 17*a* to 17*c* detected by the temperature detecting sensor 23 is above an upper limit value T1 of the printable temperature (step S2).

If T>T1 holds (Yes in step S2), the main control portion 110*a* acquires the width-direction size of the sheet P from print information included in the printing request (step S3). Then, it is determined whether or not the width-direction size of the sheet P is a predetermined size (here, the A4 lateral size) or less (step S4). If the width-direction size of the sheet P is the A4 lateral size or less (Yes in step S4), only the recording head 17*b* is to be used in the next printing process, and thus the recording heads 17*a* and 17*c* do not need to be cooled, and it is only the recording head 17*b* that needs to be cooled to T1 or below. Thus, from the cooling unit control portion 10*b*, a control signal is transmitted to the electromagnetic valve 81 to open only the second tube 51*b* (step S5), and the flow path of the cooling liquid is switched to the second tube 51*b* alone.

If the width-direction size of the sheet P is larger than the A4 lateral size (No in step S4), all of the recording heads 17*a* to 17*c* are to be used in the next printing process, and thus a control signal is transmitted to the electromagnetic valve 81 to open the first to third tubes 51*a* to 51*c* (step S6), and the flow path of the cooling liquid is switched to the first to third tubes 51*a* to 51*c*. Then, the pump 70 is driven (step S7).

Next, the cooling unit control portion 110*b* determines whether or not the temperature T of the recording heads 17*a* to 17*c* detected by the temperature detecting sensor 23 is equal to or lower than the printable temperature T1 (step S8). If T>T1 holds (No in step S8), it is determined that the cooling of the recording heads 17*a* to 17*c* by the cooling unit 50 is still necessary, and the pump 70 continues to be driven.

If T≤T1 holds (Yes in step S8), the pump 70 is stopped (step S9), and printing is started (step S10).

According to the example of the cooling control shown in FIG. 6, in starting printing with respect to a sheet P of which the width-direction size is small and for printing on which only the recording head 17*b* at the width-direction center is used, the flow path of the cooling liquid is switched to the second tube 51*b* by means of the electromagnetic valve 81 to concentrate the cooling liquid to the recording head 17*b*. In this manner, even with the configuration where the recording heads 17*a* to 17*c* and the pump 70 are not provided in a one-to-one correspondence, it is possible to suppress rise in temperature of the recording head 17*b* in a short period of time. As a result, the printing waiting time is shortened, and the printing efficiency (productivity) is improved.

Furthermore, by executing feed-forward control (predictive control) based on the sheet-P-size information acquirable in advance before printing is started, instead of by acquiring real-time temperatures of the recording heads 17*a* to 17*c* to switch the flow path of the cooling liquid, it is possible to quickly cool only whichever of the recording heads 17*a* to 17*c* needs to be cooled.

Note that, in the control example shown in FIG. 6, the pump 70 is stopped when, before printing is started, the recording heads 17*a* to 17*c* are cooled down to the upper limit value T1 of the printable temperature or below, but the pump 70 may continue to be driven even after printing is started, to thereby allow the cooling unit 50 to continue to cool the recording heads 17*a* to 17*c* during the printing process as well.

Specifically, in a case where the width-direction size of a sheet P is equal to or less than the A4 lateral size, only the second tube 51*b* is used as the flow path of the cooling liquid, and the pump 70 continues to be driven. In a case where the width-direction size of a sheet P is larger than the A4 lateral size, the first to third tubes 51*a* to 51*c* are used as the flow path of the cooling liquid, and the pump 70 continues to be driven. In this manner, it is possible to maintain the temperature of the recording heads 17*a* to 17*c* constant during a printing process and to suppress rise in temperature of the recording heads 17*a* to 17*c* when printing is finished, and thus, in starting subsequent printing, printing can be started without waiting for the temperature of the recording heads 17*a* to 17*c* to fall, and thus the printing waiting time is reduced and the printing efficiency (productivity) is further improved.

Next, a description will be given of another example of cooling control using the cooling unit 50. The temperatures of the recording heads 17*a* to 17*c* do not necessarily rise in a constant manner, and the temperatures of the recording heads 17*a* to 17*c* may rise in manners different from each other. For example, in performing printing on a sheet P having a large width-direction size, ink is ejected from all the recording heads 17*a* to 17*c*, and the extent of temperature rise depends on the number of times ink has been ejected. More specifically, whichever of the recording heads 17*a* to 17*c* has ejected ink a larger number of times than the other recording heads undergoes a more remarkable temperature rise than the other recording heads.

Thus, a coverage rate is calculated from the image data before printing is started, and a flow amount or circulation time of the cooling liquid during the printing process is adjusted corresponding to the calculated coverage rate. More specifically, printing is performed while driving the cooling unit 50 so as to increase the flow amount or the circulation time of the cooling liquid in whichever of the first to third tubes 51*a* to 51*c* serves as the flow path of the cooling liquid flowing toward whichever of the recording heads 17*a* to 17*c* corresponds to a relatively high coverage-rate region in comparison with whichever of the first to third tubes 51*a* to 51*c* serves as the flow path of the cooling liquid flowing toward whichever of the recording heads 17*a* to 17*c* corresponds to a relatively low coverage-rate region.

Figure 7:
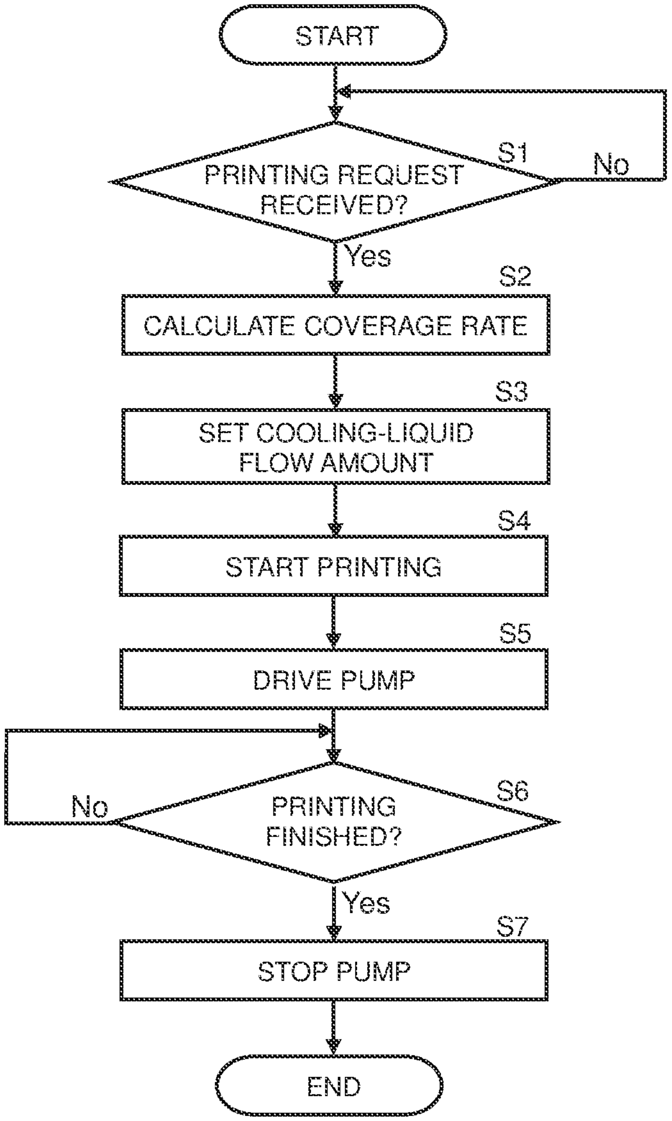
FIG. 7 is a flow chart showing an example of recording-head cooling control executed in the printer during a printing process.

FIG. 7 is a flow chart showing an example of the cooling control executed in the printer 100 with respect to the recording heads 17*a* to 17*c* during a printing process. Referring to FIGS. 1 to 5 as necessary, according to the steps shown in FIG. 7, a description will be given of a procedure of cooling the recording heads 17*a* to 17*c* during a printing process. Here, although not shown in FIG. 7, assume that, at a time point when a printing request is received, the temperature of the recording heads 17*a* to 17*c* is equal to or lower than the upper limit value of the printable temperature. The electromagnetic valve 81 is capable of not only opening/closing the first to third tubes 51*a* to 51*c*, but also adjusting the flow amount of the cooling liquid that circulates in the first to third tubes 51*a* to 51*c*.

The main control portion 110*a* determines whether or not a printing request has been received via the communication portion 29 from a host device such as a personal computer (step S1). If no printing request has been received (No in step S1), a printing standby state is maintained. If a printing request has been received (Yes in step S1), a coverage rate is calculated from the image data included in the printing request (step S2).

Next, the main control portion 110*a*, based on the coverage rate of the sheet P in the width direction, sets flow amounts of the cooling liquid to circulate in the first to third tubes 51*a* to 51*c* (step S3). For example, if the coverage rate of the center portion of the sheet P in the width direction is twice as high as the coverage rate at the opposite end portions of the sheet P in the width direction, a control signal is transmitted to the electromagnetic valve 8 to increase the flow amount of the cooling liquid to circulate in the second tube 51*b* twice as large as in the first tube 51*a* and the third tube 51*c*. Then, printing is started (step S4), and at the same time, the pump 70 is driven (step S5).

Thereafter, it is determined whether or not the printing has been finished (step S6), and if the printing is still being performed (No in step S6), the pump 70 continues to be driven. If the printing has been finished (Yes in step S6), the pump 70 is stopped (step S7), and the processing is finished.

According to the example of the cooling control shown in FIG. 7, in a case of performing printing using a sheet P having a large width-direction size, a coverage rate is calculated from image data. Then, based on the coverage rate in the width direction of the sheet P, flow amounts of the cooling liquid to circulate in the first to third tubes 51*a* to 51*c* are set. In this manner, it is possible to adjust the flow amount of the cooling liquid corresponding to a predicted rise in temperature of the recording heads 17*a* to 17*c*, and to maintain the temperature of the recording heads 17*a* to 17*c* constant during printing even with the configuration where the recording heads 17*a* to 17*c* and the pump 70 are not provided in one-to-one correspondence.

By adjusting the flow amount of the cooling liquid by performing the feed-forward control (predictive control) based on the coverage rate calculable in advance before printing is started instead of acquiring the real-time temperatures of the recording heads 17*a* and 17*b*, it is possible to perform cooling focusing on whichever of the recording heads 17*a* to 17*c* is expected to undergo a temperature rise. Moreover, when starting subsequent printing, printing can be performed without waiting for the temperature of the recording heads 17*a* to 17*c* to fall, and thus the printing waiting time is reduced and the printing efficiency (productivity) is improved.

Note that, in the control example shown in FIG. 7, the flow amounts of the cooling liquid to circulate in the first to third tubes 51*a* to 51*c* are adjusted based on the coverage rate in the width direction, but the circulation time of the cooling liquid to circulate in each of the first to third tubes 51*a* to 51*c* may be adjusted instead. Specifically, if the coverage rate at the center portion of the sheet P in the width direction is twice as high as the coverage rate at the opposite end portions of the sheet P in the width direction, a control signal is transmitted to the electromagnetic valve 81 to prolong open time of the second tube 51*b* twice as long as open time of the first and third tubes 51*a* and 51*c*, to thereby increase the circulation time of the cooling liquid to circulate in the second tube 51*b* twice as long as the circulation time of the cooling liquid to circulate in the first and third tubes 51*a* and 51*c*.

In this manner, as in the control example shown in FIG. 7, it is possible to adjust the cooling time for each of the recording heads 17*a* to 17*c* corresponding to their respective predicted temperature rises, and thus to maintain the temperature of the recording heads 17*a* to 17*c* constant during printing. It is also possible to reduce a rise in temperature of the recording heads 17*a* to 17*c* when printing is finished, and thus, when starting subsequent printing, printing can be performed without waiting for the temperature of the recording heads 17*a* to 17*c* to fall, and thus the printing waiting time is reduced and the printing efficiency (productivity) is improved. Moreover, since the electromagnetic valve 81 performs only the operations of opening and closing the first to third tubes 51*a* to 51*c*, there is no need of providing a flow amount adjusting mechanism, and thus the configuration of the electromagnetic valve 81 is simplified.

It is to be understood that the present disclosure may be practiced in any other manner than specifically described above as embodiments, and various modifications are possible within the scope of the invention. For example, in the above embodiment, the single electromagnetic valve 81 is arranged at the branching portion 55 of the first to third tubes 51*a* to 51*c*, but instead, at positions downstream of the branching portion 55, individual electromagnetic valves 81 may be arranged one for each of the first to third tubes 51*a* to 51*c*.

The present disclosure is usable in inkjet recording apparatuses that eject ink from recording heads. Use of the present disclosure makes it possible to provide an inkjet recording apparatus in which the installation space for a cooling mechanism for cooling recording heads can be reduced, and that is capable of effectively cooling only a desired recording head.

What is claimed is:

1. An inkjet recording apparatus, comprising:

a conveying portion that conveys a recording medium;

a recording portion that includes a line head for each color, the line head including a plurality of recording heads that are arranged along a width direction of the recording medium orthogonal to a recording-medium conveying direction, and that execute a printing process by ejecting ink onto the recording medium conveyed by the conveying portion;

a temperature detecting portion that detects a temperature of the recording heads; a cooling mechanism that cools the recording heads based on a result of detection by the temperature detecting portion; and a control portion that controls the cooling mechanism, wherein the cooling mechanism includes:

a storing portion that stores a cooling liquid;

a circulation path that has opposite ends thereof connected to the storing portion, that is arranged to be branched into a plurality of branch paths so as to pass near the recording heads, and that receives heat of the recording heads by means of the cooling liquid circulating therein; a heat dissipating portion that is arranged in the circulation path, at a position downstream from the recording heads with respect to a circulation direction of the cooling liquid, and that dissipates heat of the cooling liquid; and a pump that is arranged in the circulation path, at a position upstream from the recording heads with respect to the circulation direction of the cooling liquid, and that causes the cooling liquid to circulate in the circulation path, the cooling mechanism being provided one for each of the line heads, and wherein the control portion controls the cooling mechanism such that given a recording head that is predicted to undergo a temperature rise as compared with others of the recording heads, the control portion increases a flow amount or circulation time of the cooling liquid in whichever of the branch paths serves as a flow path of the cooling liquid flowing toward the recording head that is predicted to undergo a temperature rise, as compared with others of the branch paths.

2. The inkjet recording apparatus according to claim 1, wherein, if the temperature of the recording heads is higher than an upper limit value of printable temperature and only a part of the recording heads is used in a next execution of the printing process, before starting the printing process, the control portion drives the cooling mechanism while opening only whichever of the branch paths serves as a flow path of the cooling liquid flowing toward whichever of the recording heads is used in the printing process.

3. The inkjet recording apparatus according to claim 2, further comprising:

an input portion to which a printing request is input, the printing request including image information of an image to be recorded on the recording medium, wherein the control portion acquires information of a width-direction size of the recording medium included in the image information, and based on the acquired information of the width-direction size of the recording medium, the control portion specifies, among the recording heads, a recording head to be used in the printing process.

4. The inkjet recording apparatus according to claim 3, wherein the line head includes three recording heads as the recording heads, the three recording heads being arranged along the width direction; and in a case where the width-direction size of the recording medium is equal to or less than a predetermined size, the control portion drives the cooling mechanism while opening only a branch path of the branch paths that serves as a flow path of the cooling liquid flowing toward a recording head of the three recording heads that is located at a center in the width direction.

5. The inkjet recording apparatus according to claim 2, wherein also after starting the printing process, the control portion drives the cooling mechanism while opening only whichever of the branch paths serves as the flow path of the cooling liquid flowing toward whichever of the recording heads is used in the printing process.

6. The inkjet recording apparatus according to claim 1, further comprising:

an input portion to which a printing request is input, the printing request including image information of an image to be recorded on the recording medium, wherein the control portion calculates a coverage rate of an image in the width direction of the recording medium based on the image information; and after starting the printing process, the control portion drives the cooling mechanism, increasing a flow amount or circulation time of the cooling liquid in whichever of the branch paths serves as a flow path of the cooling liquid flowing toward whichever of the recording heads corresponds to a region where the coverage rate is relatively high, as compared with in whichever of the branch paths serves as a flow path of the cooling liquid flowing toward whichever of the recording heads corresponds to a region where the coverage rate is relatively low.

7. The inkjet recording apparatus according to claim 1, wherein the cooling mechanism is provided at a branching portion of the branch paths, and includes an electromagnetic valve capable of individually opening and closing flow paths of the cooling liquid flowing toward the recording heads; and the control portion, using the electromagnetic valve, opens only whichever of the branch paths serves as the flow path of the cooling liquid flowing toward the recording head that is predicted to undergo a temperature rise, or increases a flow amount or circulation time of the cooling liquid flowing toward the recording head that is predicted to undergo a temperature rise.

8. The inkjet recording apparatus according to claim 1, wherein the circulation path is in contact with each of the recording heads via a heat receiving portion formed of a thermally conductive material, and the heat receiving portion is arranged adjacent to an IC chip mounted on each of the recording heads.

* * * * *